(12) United States Patent
Siao

(10) Patent No.: US 11,840,001 B2
(45) Date of Patent: Dec. 12, 2023

(54) INJECTION MACHINE FOR RECYCLED PLASTIC INJECTION MOLDING SYSTEM

(71) Applicant: JING SI PURELAND CO., LTD., Taipei (TW)

(72) Inventor: Marshall Q. Siao, Xincheng Township (TW)

(73) Assignee: JING SI PURELAND CO., LTD., Taipei (TW)

( * ) Notice: Subject to any disclaimer, the term of this patent is extended or adjusted under 35 U.S.C. 154(b) by 0 days.

(21) Appl. No.: 17/243,608

(22) Filed: Apr. 29, 2021

(65) Prior Publication Data
US 2022/0055272 A1   Feb. 24, 2022

(30) Foreign Application Priority Data

Aug. 18, 2020   (TW) ................................ 10912808.2

(51) Int. Cl.
*B29C 45/18* (2006.01)
*B29C 45/53* (2006.01)
(Continued)

(52) U.S. Cl.
CPC ............ *B29C 45/18* (2013.01); *B29C 45/531* (2013.01); *B29C 45/54* (2013.01); *B29C 45/581* (2013.01);
(Continued)

(58) Field of Classification Search
CPC ........ B29C 45/18; B29C 45/531; B29C 45/45
See application file for complete search history.

(56) References Cited

U.S. PATENT DOCUMENTS 6,241,932 B1    6/2001  Choi et al.
6,309,203 B1 * 10/2001  Tamaki ............... B29C 45/5008
                                              425/149
(Continued)

FOREIGN PATENT DOCUMENTS

CN        1139039 A       1/1997
CN        2892446 Y   *   4/2007
(Continued)

OTHER PUBLICATIONS

Machine translation DE4229254C2 (Year: 1999).*
(Continued)

*Primary Examiner* — Matthew J Daniels
*Assistant Examiner* — Wayne K. Swier
(74) *Attorney, Agent, or Firm* — ScienBiziP, P.C.

(57) ABSTRACT

The present disclosure provides an injection machine for a recycled plastic injection molding system. The injection machine comprises a supplying system configured to drive plastics from an entry end to downstream of receiving route, a heating system disposed to downstream of the supplying system and configured to melt plastics and drive plastics to the downstream of receiving route, and a buffer system disposed to downstream of the heating system and configured to be a receiving state and a supplying state. When the buffer system is in the receiving state, the buffer system is configured to receiving plastics from the heating system. When the buffer system is in the supplying state, the buffer system is configured to drive plastics to downstream of the receiving route.

10 Claims, 19 Drawing Sheets

(51) Int. Cl.
  *B29C 45/54* (2006.01)
  *B29C 45/58* (2006.01)
  *B29C 45/60* (2006.01)
  *B29C 45/62* (2006.01)
  *B29C 45/74* (2006.01)
  *B29K 105/26* (2006.01)

(52) U.S. Cl.
  CPC ............ *B29C 45/586* (2013.01); *B29C 45/60* (2013.01); *B29C 45/62* (2013.01); *B29C 45/74* (2013.01); *B29C 2045/1875* (2013.01); *B29C 2045/583* (2013.01); *B29K 2105/26* (2013.01)

(56) References Cited

U.S. PATENT DOCUMENTS

| | | | |
|---|---|---|---|
| 6,530,777 | B1 | 3/2003 | Ganz et al. |
| 2003/0147985 | A1* | 8/2003 | Kim ................... B29B 7/248 425/215 |
| 2006/0151643 | A1* | 7/2006 | Tirelli .................. B29B 13/10 241/23 |
| 2020/0109250 | A1* | 4/2020 | Hamidinejad ........ B29C 48/022 |

FOREIGN PATENT DOCUMENTS

| | | | | |
|---|---|---|---|---|
| CN | 101264653 | A | | 9/2008 |
| CN | 101535028 | A | | 9/2009 |
| CN | 102268744 | A | * | 12/2011 ............ B29B 7/428 |
| CN | 204278423 | U | | 4/2015 |
| CN | 205735772 | U | * | 11/2016 |
| CN | 206066816 | U | * | 4/2017 ............ B29C 31/04 |
| CN | 206066816 | U | | 4/2017 |
| CN | 109018881 | A | * | 12/2018 |
| CN | 109176956 | A | | 1/2019 |
| CN | 209007923 | U | | 6/2019 |
| CN | 110774550 | A | | 2/2020 |
| CN | 111231224 | A | | 6/2020 |
| CN | 210999711 | U | | 7/2020 |
| DE | 4229254 | C2 | * | 4/1999 ............ B29C 45/07 |
| DE | 20109191 | U1 | | 10/2001 |
| DE | 102014003760 | A1 | * | 9/2015 ............ B29C 31/04 |
| DE | 102014003760 | A1 | | 9/2015 |
| EP | 0729821 | A2 | | 9/1996 |
| GB | 1380082 | A | | 1/1975 |
| JP | S4977963 | | | 7/1974 |
| JP | S4998467 | | | 9/1974 |
| JP | H07060803 | A | | 3/1995 |
| JP | H07241851 | A | | 9/1995 |
| JP | H08229948 | A | | 9/1996 |
| JP | H09503715 | A | | 4/1997 |
| JP | H01158469 | A | | 3/1999 |
| JP | 2001191375 | A | | 7/2001 |
| JP | 2002166445 | A | | 6/2002 |
| JP | 2003285329 | A | | 10/2003 |
| JP | 2004322438 | A | | 11/2004 |
| JP | 2004351894 | A | | 12/2004 |
| JP | 2004351895 | A | | 12/2004 |
| JP | 2005305926 | A | | 11/2005 |
| JP | 2006123280 | A | | 5/2006 |
| JP | 2006272669 | A | | 10/2006 |
| JP | 2008155582 | A | | 7/2008 |
| JP | 2010280190 | A | | 12/2010 |
| KR | 200333370 | Y1 | | 11/2003 |
| KR | 20050115155 | A | | 12/2005 |
| TW | 200520933 | A | | 7/2005 |
| TW | M465276 | U | | 11/2013 |
| TW | 201347950 | A | | 12/2013 |
| TW | M581979 | U | | 8/2019 |
| WO | WO-8902816 | A | * | 4/1989 ......... B29B 17/0042 |

OTHER PUBLICATIONS

Machine translation CN2892446Y (Year: 2007).*
Machine translation CN205735772U (Year: 2016).*
Machine translation CN109018881A (Year: 2018).*
Machine translation WO8902816A1 (Year: 1989).*
Machine translation CN102268744A (Year: 2011).*
Machine translation DE102014003760A1 (Year: 2015).*
Machine translation CN206066816U (Year: 2017).*

* cited by examiner

2

INJECTION MACHINE FOR RECYCLED PLASTIC INJECTION MOLDING SYSTEM

CROSS-REFERENCE TO RELATED APPLICATIONS

This application claims the benefit of Taiwan Patent Application No. 109128082 filed on Aug. 18, 2020, which is hereby incorporated by reference herein and made a part of specification.

BACKGROUND

1. Field

The present disclosure generally relates to a plastic injection molding system, in particular to an injection machine that combines environmental protection and high injection volume.

2. Related Art

In recent years, the impact of climate change or global warming, the rise of environmental protection concepts, and circular economy have gradually received attention, such as recycled products. Recycled plastic in recycled products refers to plastic raw materials obtained after processing waste plastics through physical or chemical methods such as pretreatment, melt granulation, modification, etc. It refers to the reuse of plastics.

However, the production of recycled plastic products with conventional plastic injection machines will encounter some problems. One is that it is not easy to feed the injection machine with material. Part of the recycled plastic that is too light, such as PE coating film fragments, will make it difficult to feed material. If the proportion of PE coating film in plastic is high, the plastic is likely to float upward due to static electricity, thus, causing the injection machine to transport and difficulty in supplying material.

The second is that it is difficult to mass produce. Mass production means a higher the injection volume of injection machine is needed. However, the higher the injection volume, the greater the clamping force of the machine is required and a higher cost and energy is required for the equipment. Thus, it does not meet the concept of economic efficiency and environmental protection.

Therefore, providing an environmentally friendly, low-cost, and high volume injection machine is a problem in the field to be solved.

SUMMARY

An objective of the present disclosure is to provide an environmentally friendly, low-cost, and high volume injection machine for plastic injection molding.

Accordingly, one aspect of the instant disclosure provides an injection machine for a recycled plastic injection molding system used with at least one molding device to produce an end product from plastic, the injection machine comprises a supplying system disposed on an upstream of a receiving route of the injection machine, the supply system having a first material drive device and configured to drive the plastic from an entry end to a downstream of a receiving route of the supplying system; a heating system disposed on the downstream of the receiving route of the supplying system, the heating system having a second material drive device and a heating device, the first material drive device extends to the heating system, the heating device is configured to heat and transform the plastic to molten state, the second material drive device is configured to drive the plastic to a downstream of a receiving route of the heating system; a buffer system is disposed on the downstream of the receiving route of the heating system, the buffer system having a piston and a cylinder coupled to the second material drive device, the buffer system is configured to have a receiving state and a supplying state, the buffer system is configured to receive the plastic from the heating system and push the piston to a receiving position when the buffer system is at the receiving state, the buffer system is configured to drive the plastic to the downstream of the receiving route of the injection machine when the buffer system is at the supplying state; and a switch valve disposed between the heating system and the buffer system and configured to selectively trigger the receiving state and the supplying state of the buffer system, the buffer system is switched to the receiving state when the switch valve is at open state, the buffer system is switched to the supplying state when the switch valve is at close state.

In some embodiments, the first material drive device and the second material drive device are configured to be at a distance from each other, the distance ranges between 20-40 mm.

In some embodiments, the injection machine further comprises a pressure holding system disposed on a downstream of a receiving route of the buffer system, the pressure holding system having a pressure holding device, the pressure holding device configured to provide the molding device with a pressure.

In some embodiments, the first material drive device has a first driver and a feed screw.

In some embodiments, the second material drive device has a second driver and a heating screw.

In some embodiments, the cylinder has a plunger tube, and the piston has a plunger rod.

In some embodiments, the injection machine further comprises a drying system disposed on an upstream of the supplying system and configured to provide the plastic to the supplying system, the drying system having a dry mixing barrel and a side conveyor; the dry mixing barrel has a barrel and a stirring rod penetrating the barrel; the side conveyor disposed between the dry mixing barrel and the supplying system.

In some embodiments, the injection machine further comprises at least one blade is arranged at a surface of the feed screw and configured to prevent the plastic from floating upward.

Accordingly, one aspect of the instant disclosure provides an injection machine for a recycled plastic injection molding system used with at least one molding device to produce an end product from plastic, the injection machine comprises a supplying system having a hopper, a first driver disposed on the hopper, the first driver has a feed screw penetrating the hopper, the first driver is configured to drive the feed screw to rotate; a heating system disposed on a downstream of the supplying system, the heating system having a heating pipe, wherein the feed screw of the first driver extends to the heating system, a second driver is disposed on one end of the heating pipe, the second driver has a heating screw penetrating the heating pipe, the second driver configured to drive the heating screw to rotate; and a buffer system disposed on a downstream of the heating system, the buffer system having a plunger tube and a plunger rod slidably installed and sealed within the plunger tube.

In some embodiments, the injection machine further comprises a pressure holding system disposed on a downstream of the buffer system, the pressure holding system having a pressure holding pipe and a pressure holding rod slidably installed and sealed within the pressure holding pipe.

In some embodiments, the first driver is configured to drive the feed screw to further drive the plastic from the hopper to the downstream of the supplying system.

In some embodiments, the second driver is configured to drive the heating screw to rotate and drive the plastic to the downstream of the heating system; the heating pipe having a heating device configured to heat and turn the plastic to molten state.

In some embodiments, the feed screw and the heating screw are configured to be at a distance from each other, the distance ranges between 20-40 mm.

In some embodiments, the injection machine further comprises a drying system disposed on an upstream of the supplying system and configured to deliver the plastic to the supplying system, the drying system having a dry mixing barrel and a side conveyor, the dry mixing barrel having a barrel and a stirring rod disposed within the barrel; the side conveyor disposed between the dry mixing barrel and the supplying system.

In some embodiments, the first driver and the second driver have frequency conversion drive motor.

In some embodiments, the injection machine further comprises at least one blade is arranged at a surface of the feed screw and configure to prevent the plastic from floating upward.

BRIEF DESCRIPTION OF THE DRAWINGS

So that the manner in which the above recited features of the present disclosure can 25 be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
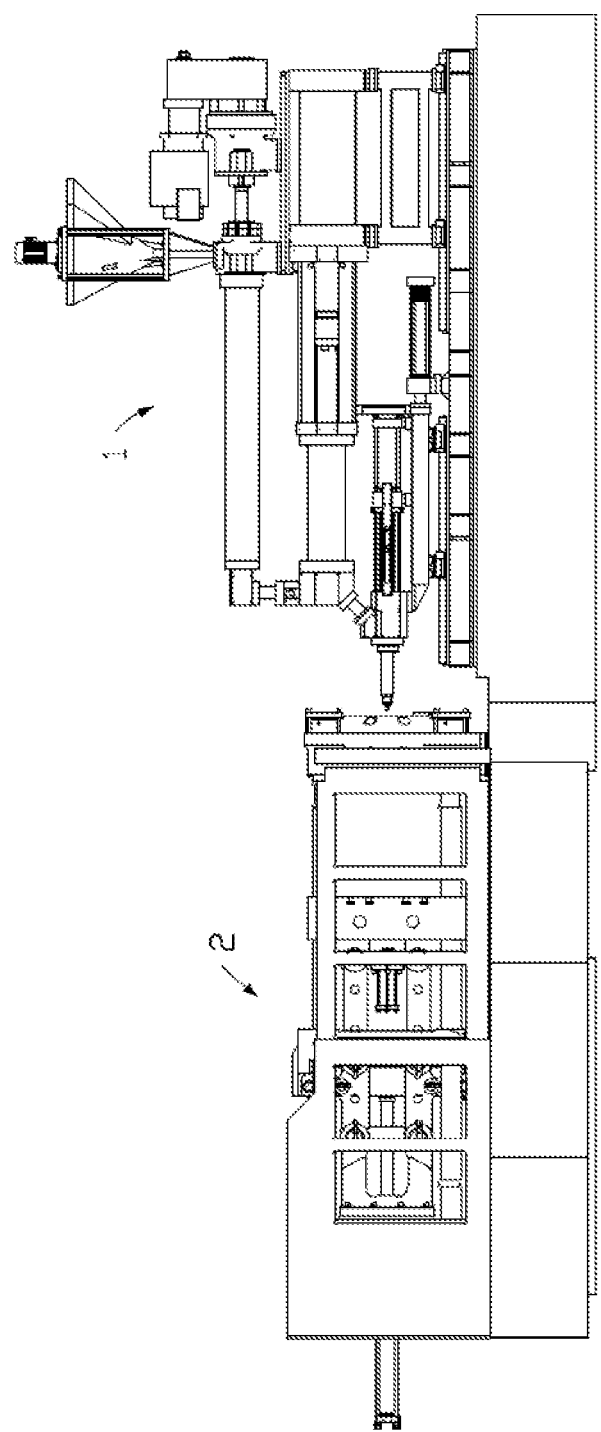
FIG. 1 illustrates a side view of a plastic injection molding system according to some embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the following text, "plastic" refers to an organic polymer material that uses resin as the main component, is molded into a certain shape at a certain temperature and pressure, and can maintain a predetermined shape at room temperature.

In the following text, "recycled plastic" refers to plastic raw materials that are re-obtained after processing waste plastics through physical or chemical methods such as pretreatment, melt granulation, and modification. For example, PE coating film, HDPE cleaner, HDPE milk bottle, HDPE milk, PP bottle cap, PET bottle cap or PET packing tape, etc.

In the following text, "end product" refers to a plastic product that is finished after being poured into a mold to form a mold shape and cooled. The end product can be applied to various parts and fields. Taking the construction industry as an example, the end product can be a building material, such as permeable bricks, environmental protection bricks, etc.

Figure 2:
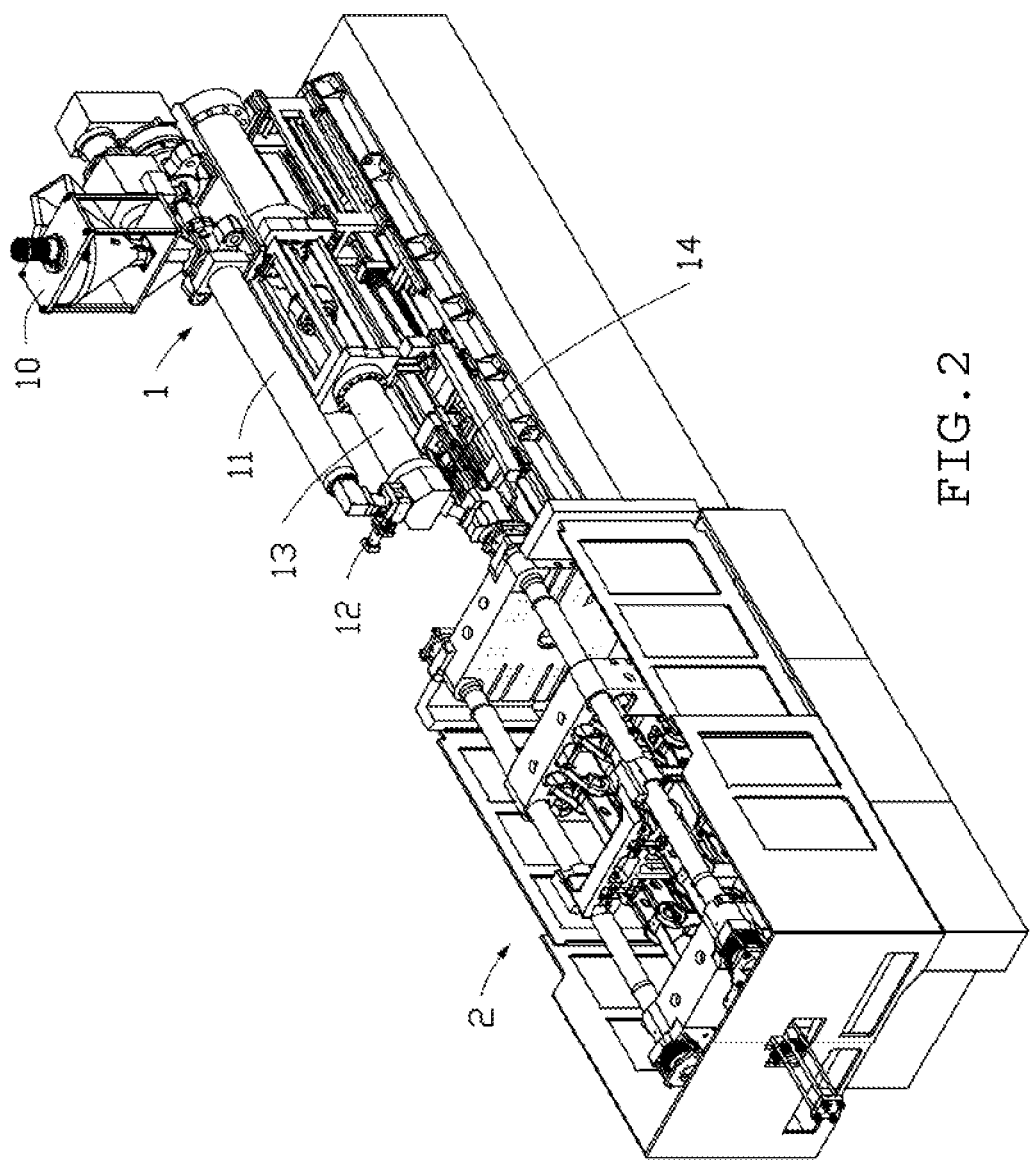
FIG. 2 illustrates an isometric view of a plastic injection molding system according to some embodiments of the present disclosure.
Figure 3:
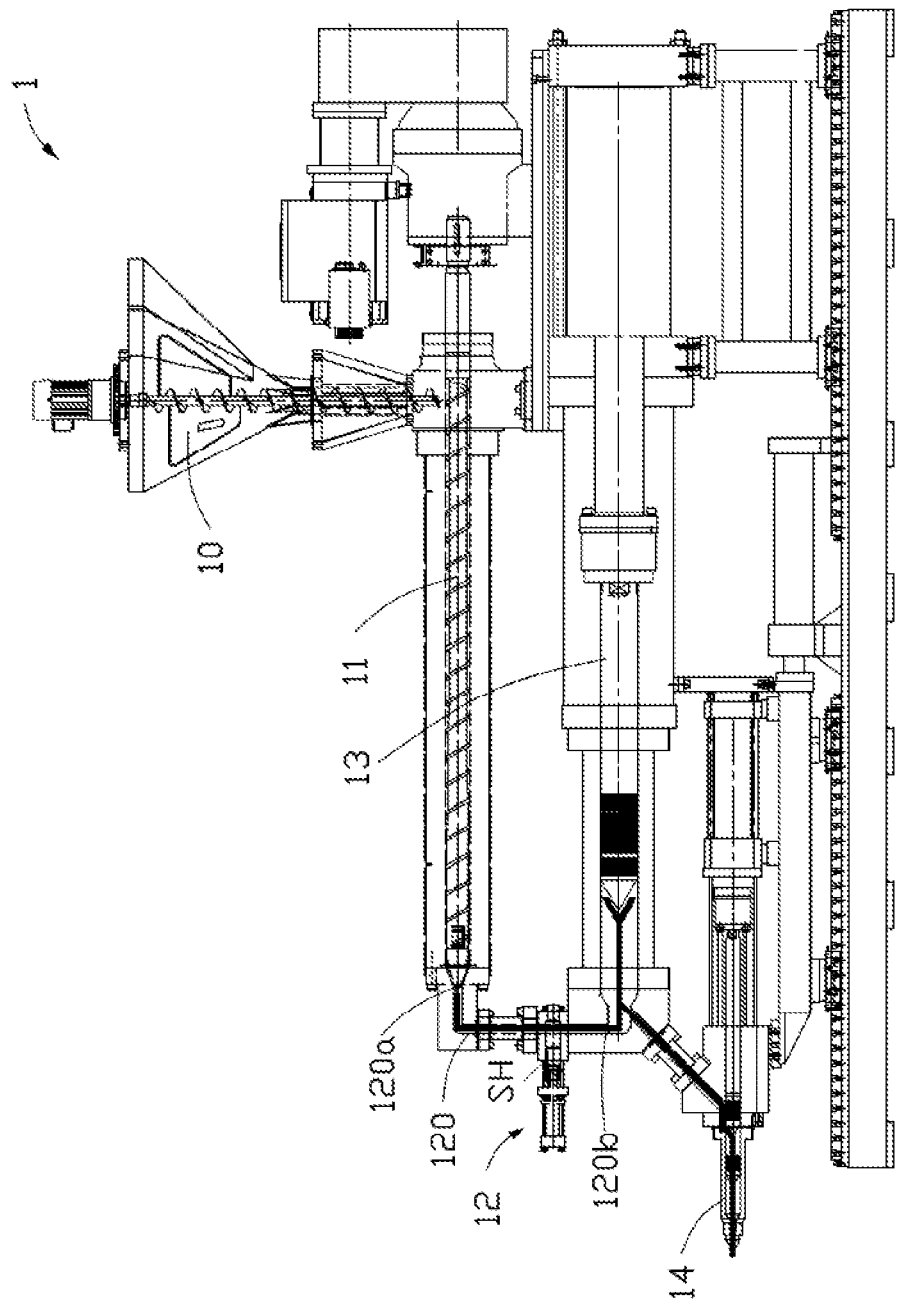
FIG. 3 illustrates a sectional view of an injection machine according to some embodiments of the present disclosure.

A recycled plastic injection molding system shown in FIGS. 1-3 includes an injection machine land a molding device 2. The specification of the injection machine is a machine with a clamping force of 600 T, but it is not limited to thereof. The injection machine 1 includes a supplying system 10, a heating system 11, a plastic channel 12, a plunger system 13, and a pressure holding system 14.

Figure 4:
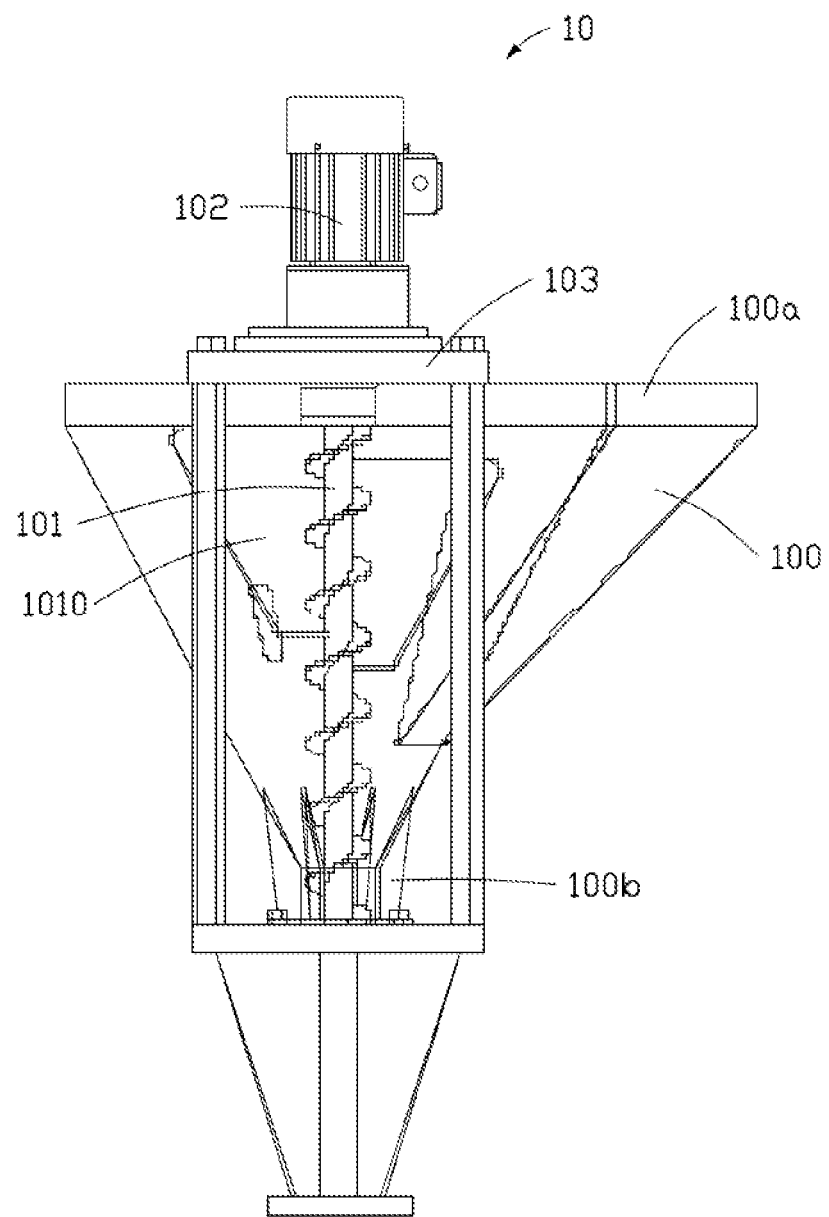
FIG. 4 illustrates a sectional view of a supplying system of an injection machine according to some embodiments of the present disclosure.

As shown in a sectional view of a supplying system 10 in FIG. 4, the supplying system 10 is disposed on an upstream of a receiving route of the injection machine and configured to supply plastic to the heating system 11. The supplying system 10 has a first material drive device. In some embodiments, a first material drive device may include a feed screw 101 and a first driver 102 as shown in FIG. 4. The first material drive device is configured to drive the plastic from the entry end to the downstream of the receiving route. In some embodiments, entry end may be a hopper 100 as shown in FIG. 4. The first driver 102 is disposed over the hopper 100. The feed screw 101 is disposed within the hopper 100 and coupled to one end of the first driver 102.

The hopper 100 of FIG. 4 is a hollow body and forms a cone-shaped space inside. The hopper 100 includes an upper opening 100a and a lower opening 100b. The space connects to the upper opening 100a and the lower opening 100b to allow the plastic to enter from upper opening 100a, exit through the lower opening 100b, and enter into the heating system 11. One end of the feed screw 101 is coupled to the first driver 102 and passes through the inner space of the hopper 100 to enter the heating system 11 through the lower opening 100b of the hopper 100. The surface of the feed screw 101 is provided with a spiral sheet.

The first driver 102 shown in FIG. 4 drives the feed screw 101 to rotate along its own axis. A platform 103 is disposed above the hopper 100 and the first driver 102 is disposed on the platform 103.

The surface of the feed screw 101 of the supplying system 10 shown in FIG. 4 can be provided with at least one blade 1010. The feed screw 101 is configured to move the plastic to the lower opening 100b. At the same time, the blade 1010 prevents the plastic from floating upward due to the lightness and electrostatic effect of the material.

Figure 5:
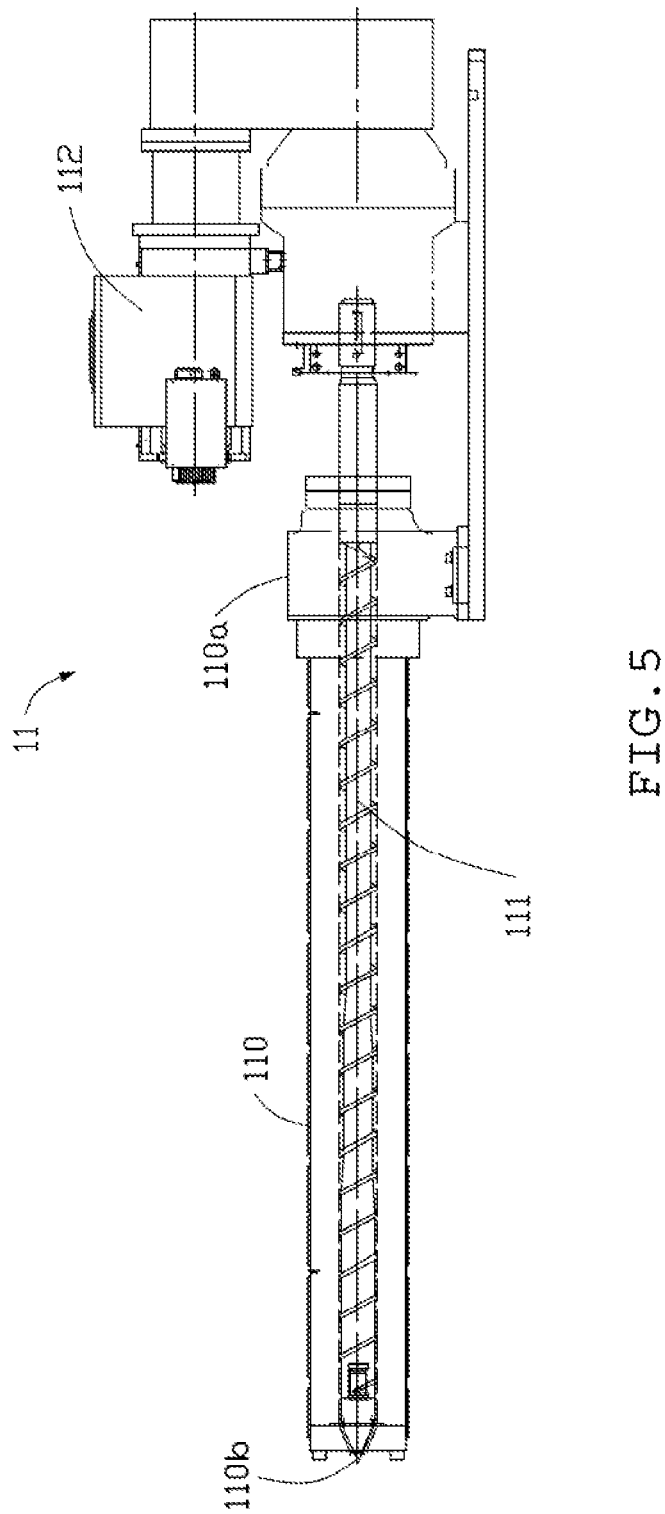
FIG. 5 illustrates a sectional view of a heating system of an injection machine according to some embodiments of the present disclosure.

As shown in FIGS. 3 and 5, a heating system 11 is disposed on a downstream of the supplying system and includes a second material drive device and a heating device. The second material drive device is configured to drive the plastic to a downstream of the receiving route of the heating system. The heating device is configured to heat the plastic until melted. The first material drive device extends into the heating system 11 and is configured to heat the plastic to a molten state. In some embodiments, the second material drive device may include a heating screw 111 and a second driver 112 as shown in FIG. 5. In some embodiments, the heating device may include a heating pipe 110 that extends laterally as shown in FIG. 5. The second driver 112 is disposed on one end of the heating pipe 110. The heating screw 111 axially penetrates the heating pipe 110. The heating screw 111 penetrates one end of the heating pipe 110 and connects to the second driver 112.

The heating pipe 110 of FIG. 5 is a hollow body. One end of the heating pipe 110 facing one side of the supplying system 10 is provided with a heating inlet 110a. Another end of the heating pipe 110 at a distance from the heating inlet 110a is a heating outlet 110b. The heating inlet 110a and the lower opening 100b of the hopper 100 are connected to each other. The heating outlet 110b and the plastic channel 12 are connected to each other. Thus, the plastic can enter the heating pipe 110 from the lower opening 100b of the hopper 100 through the heating inlet 110a, exit from the heating outlet 110b of the heating pipe 110, and enter into the plastic channel 12. A heating unit (not shown in the figure) is provided on the outer peripheral surface of the heating pipe 110 to heat the recycled plastic to a molten state.

The heating screw 111 is inserted inside the heating pipe 110. The surface of the heating screw 111 is formed with raised threads. One end of the heating screw 111 penetrates through the heating pipe 110 and connects to the second driver 12. The second driver 112 drives the heating screw 111 to rotate along its axis at high speed and push the recycled plastic in the molten state towards the heating outlet 110b. In some embodiments, the diameter of heating screw 111 is about 100 mm, but it is not limited to thereto.

In some embodiments, the feed screw 101 of the supplying system 10 penetrates through the lower opening 100b to enter the heating pipe 110. The feed screw 101 of the supplying system 10 may be disposed vertically from the heating screw 111. In some embodiments, a lower end of the feed screw 101 is pointed towards the threads of the heating screw 111. Further, the lower end of the feed screw 101 is at a distance from the threads of the heating screw 111. When the distance is too big, the lightness and the electrostatic effect of the recycled plastic will cause it to float. As a result, the recycled plastic could not fall down to heating system 11 smoothly and lead to insufficient supply of the recycled plastic. But, when the distance is too small, too much recycled plastic that is not in a molten state may accumulate in the heating pipe 110 near the heating inlet 110a. In some embodiments, the distance ranges between 20-40 mm, but it is not limited to thereto.

Furthermore, the nature of plastic is different, especially recycled plastic. The source of plastic can include various waste plastics or a mixture thereof, such as, PE coating from paper tableware and PP bottle caps. The different type of plastics will affect the feeding rate of the injection machine. When there are more light weight plastic (i.e. PE coating), the plastic will not fall easily and cause the supplying system 10 and heating system 11 to run dry due to insufficient supply. However, when there are more heavy plastic (i.e. PP bottle caps), the plastic will fall down through gravity. If the plastic feeds too fast, it may cause too much material.

In some embodiments, the first driver 102 and the second driver 112 use a frequency conversion drive motor to adjust the feeding rate between the supplying system 10 and the heating system 11. When the plastic is lighter, the speed of the frequency conversion drive motor can be increased to increase the supply rate and prevent the supplying system 10 and heating system 11 from running idle due to insufficient supply of material. When the plastic is heavier, the speed of the frequency conversion drive motor can be decreased to decrease the supply rate and prevent excess supply.

As shown in FIG. 3, the plastic channel 12 includes a material pipe 120 and a switch valve SH. The material pipe 120 is a hollow body. The material pipe 120 has a material pipe inlet 120a connected to the heating outlet 110b and a material pipe outlet 120b connected to an enter buffer system 13. The plastic in a molten state passes through the material pipe inlet 120a to enter the material pipe 120 after leaving the heating system 11. After, the molten plastic leaves the material pipe outlet 120b. The switch valve SH is disposed on the material pipe 120 and is configured to selectively trigger the receiving state and the supplying state of the buffer system 13 to control the plastic entering the buffer system 13 from the heating system 11. When the switch valve SH is at open state, the buffer system will be at the receiving state and the plastic will pass through the material pipe 120 to enter buffer system 13. When the switch valve SH is at close state, the buffer system 13 will be at the supplying state and the plastic is not able to pass through the material pipe 120.

If a large amount of plastic continues to be fed directly into the molding device 2 from the heating system 11, the plastic accumulated in the heating outlet 110b will cause the heating screw 111 to generate a reverse force. The reverse force can cause the heating screw 111 to retreat in the opposite direction of the ejection, which in turn can make the filling volume unstable. Therefore, an additional buffer system 13 is required to ensure stable plastic filling.

Figure 6:
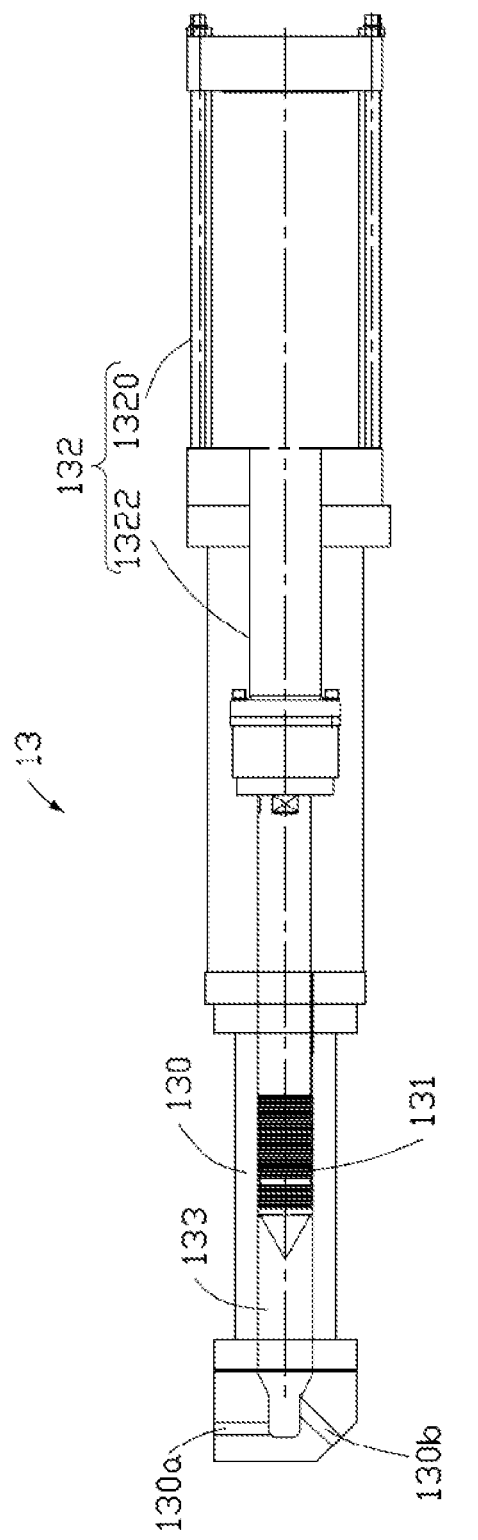
FIG. 6 illustrates a sectional view of a buffer system of an injection machine according to some embodiments of the present disclosure.

FIGS. 3 and 6 shows a diagram of the buffer system 13. The buffer system 13 is disposed on a downstream of a heating system 11. The buffer system 13 includes a cylinder connected to the second material drive device and a piston. In some embodiments, the cylinder may be a plunger tube 130 that extends laterally as shown in FIG. 6. The piston may be a plunger rod 131 that is slidably arranged in the axis of the plunger tube 130 and is sealed within the plunger tube 130.

The plunger tube 130 has a hollow body to accommodate the plastic and the plunger rod 131. The plunger tube 130 near one end of the material pipe 120 has a plunger inlet 130a and a plunger outlet 130b. The plunger inlet 130a facing the material pipe outlet 120b is connected to the material pipe outlet 120b. The plunger outlet 130b facing the pressure holding inlet 140a is connected to the pressure holding inlet 140a.

The plunger rod 131 of FIG. 6 is a straight rod. One end of the plunger rod 131 facing the material pipe 120 is in contact with plastic, and the other end of the plunger rod 131 away from the material pipe 120 is provided with a plunger cylinder 132. The plunger cylinder 132 includes a cylinder body 1320 and a shaft 1322. A chamber is formed inside the cylinder body 1320 where the shaft 1322 is inserted and pushed. The shaft 1322 of the plunger cylinder 132 is connected to the plunger rod 131 disposed at a distance from one end of the material pipe 120, wherein the plunger cylinder 132 hydraulically pushes the plunger rod 131 in the plunger tube 130 to reciprocate. In some embodiments, a diameter of the plunger rod 131 is about 150 mm, but it is not limited to thereto.

The inner surface of the plunger tube 130 in FIG. 6 and one end of the plunger rod 131 facing the material pipe 120 define a fluid space 133. The molten plastic flows out from the material pipe outlet 120b and enters the fluid space 133 through the plunger inlet 130a. That is, the plastic enters the fluid space 133 to achieve the desired injection volume. A pressure is generated on the inner surface of the plunger tube 130 and the plunger rod 131 to push the plunger rod 131. In this way, the plunger rod 131 is moved towards the plunger cylinder 132 to reach the receiving position. Then, the plunger cylinder 132 drives the plunger rod 131 in the plunger tube 130 using oil pressure to squeeze the plastic in the fluid space 133 into the plunger outlet 130b.

Figure 7:
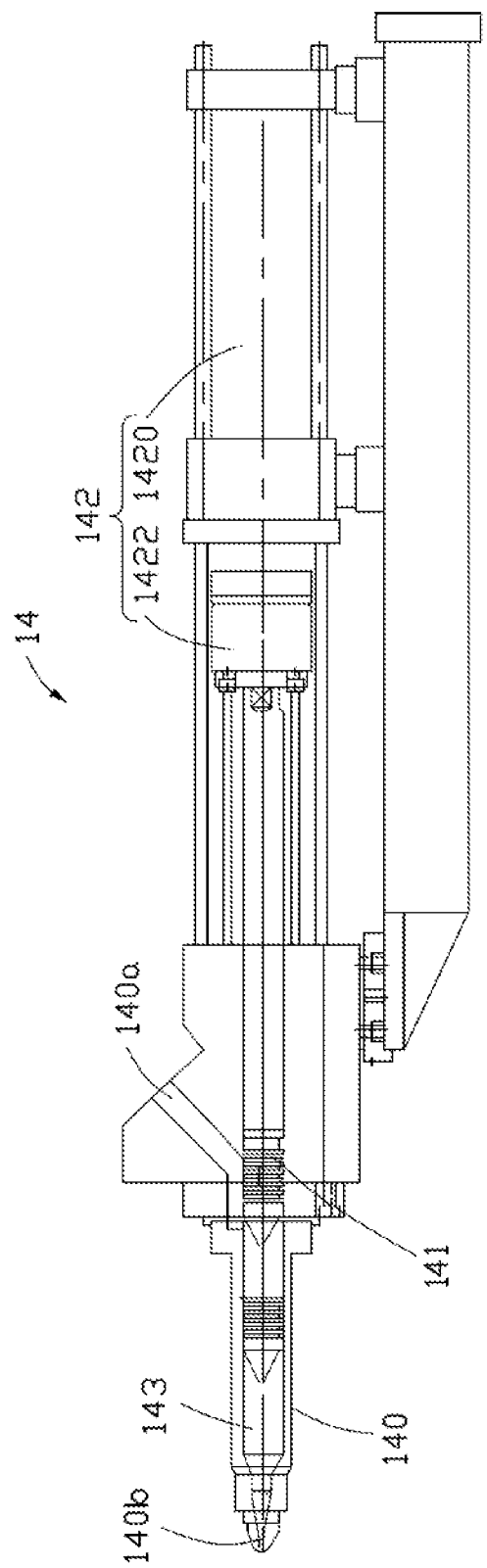
FIG. 7 illustrates a sectional view of a pressure holding system of an injection machine according to some embodiments of the present disclosure.

In some embodiments, as shown in FIGS. 3 and 7, the pressure holding system 14 is disposed on a downstream of buffer system 13. The pressure holding system 14 includes a pressure holding device. The pressure holding device is configured to continuously provide a predetermined pressure to the molding device 2. In some embodiments, the pressure holding device may include a pressure holding pipe 140 that extends laterally as shown in FIG. 7, and a pressure holding rod 141 that is slidably arranged in the pressure holding pipe 140 along an axial direction and sealingly fitted within the pressure holding pipe 140.

The pressure holding pipe 140 as shown in FIG. 7 is a hollow body used to accommodate the plastic and pressure holding rod 141. The pressure holding pipe 140 has a pressure holding inlet 140a that is facing and in communication with the plunger outlet 130b and a nozzle 140b that is facing and in communication with molding device 2.

The pressure holding rod 141 as shown in FIG. 7 is a straight rod. One end of the pressure holding rod 141 is provided with a pressure holding cylinder 142 and the other end facing away from the pressure holding cylinder 142 is in contact with the plastic. The pressure holding cylinder 142 includes a cylinder body 1420 and a shaft 1422. A chamber is formed within the cylinder body 1420 for inserting and pushing the shaft 1422. The shaft 1422 of the pressure holding cylinder 142 and one end of the pressure holding rod 141 away from the nozzle 140b are connected, whereby the pressure holding cylinder 142 hydraulically pushes the pressure holding rod 141 in the pressure holding pipe 140 to reciprocate.

As shown in FIGS. 3 and 7, the inner surface of the pressure holding pipe 140 and one end of the pressure holding rod 141 away from the pressure holding cylinder 142 defines a pressure holding chamber 143. The molten plastic flowing out of the plunger outlet 130b enters the pressure holding chamber 143 from the pressure holding pipe inlet 140a and exits into the molding device 2 from the nozzle 140b. When the plastic enters the molding device 2, the pressure holding cylinder 142 of the pressure holding system 14 will drive the pressure holding rod 141 to continuously exert a pressure on the plastic in the pressure holding pipe 140.

In this embodiment, the buffer system and the pressure holding system are separate and independent systems. However, in some embodiments, the buffer system and pressure holding system can be combined into one system, and the buffer system has a pressure holding capability.

Figure 8:
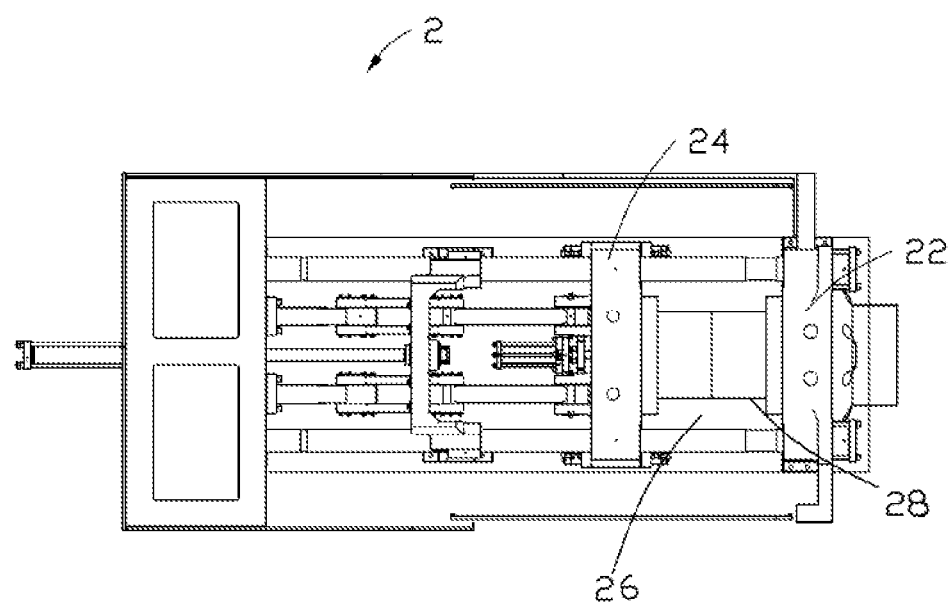
FIG. 8 illustrates a top view of a molding device according to some embodiments of the present disclosure.

FIG. 8 illustrates a top view of a molding device according to some embodiments of the present disclosure. The molding device 2 includes a fixed mold plate 22 and a movable mold plate 24 opposite fixed mold plate 22. The fixed mold plate 22 is disposed on a side of the molding device 2 near the injection machine 1. The movable mold plate 24 is disposed on a side of the molding device 2 opposite the fixed mold plate 22 and away from injection machine 1. The fixed mold plate 22 and the movable mold plate 24 can be connected to each other to form a mold space 26 of a mold 28. The mold 28 has a nozzle (not shown in the figures) in contact with the nozzle 140b of the injection machine 1.

The plastic leaves from nozzle 140b, enters the nozzle of mold, and fills the mold cavity in mold 28. When the plastic gradually fills the mold cavity, the pressure holding cylinder 142 of the pressure holding system 14 will drive the pressure holding rod 141 and continuously apply a pressure to the plastic in the pressure holding pipe 140. In this way, the shrinkage of the plastic volume due to cooling is compensated to ensure that the cavity is completely filled. The pressure is applied until the flow gate (not shown in the figure) has solidified and the end product is cooled within the mold. After, the movable mold plate 24 will move away from the fixed mold plate 22, and the thimble mechanism (not shown in the figure) on the mold 28 will eject the end product.

The plastic injection molding machine can be equipped with a mechanical arm (not shown in the figure) to take out the ejected end product.

Figure 15:
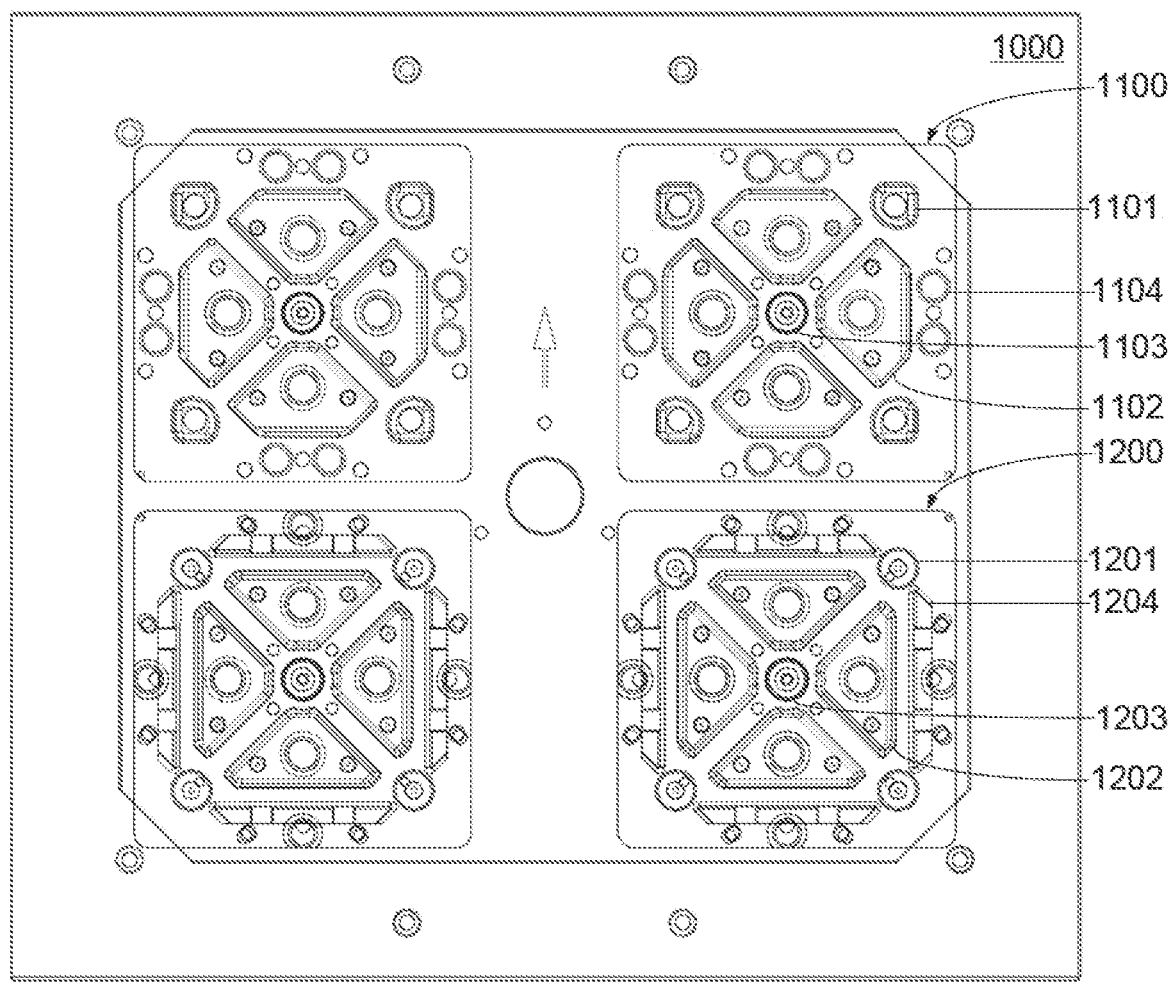
FIG. 15 illustrates a planar view of a cooling rack according to some embodiments of the present disclosure.
Figure 16:
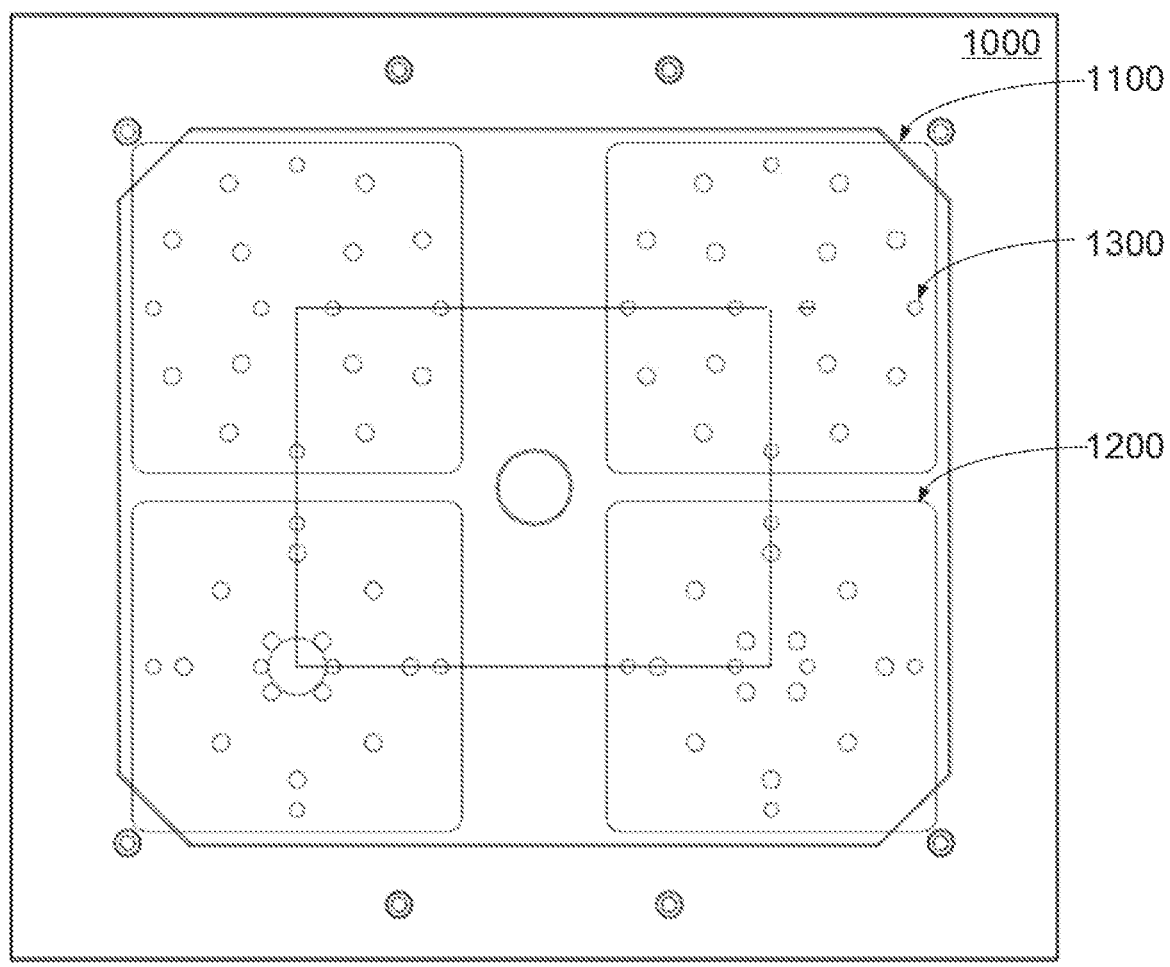
FIG. 16 illustrates a side view of a cooling rack according to some embodiments of the present disclosure.
Figure 17:
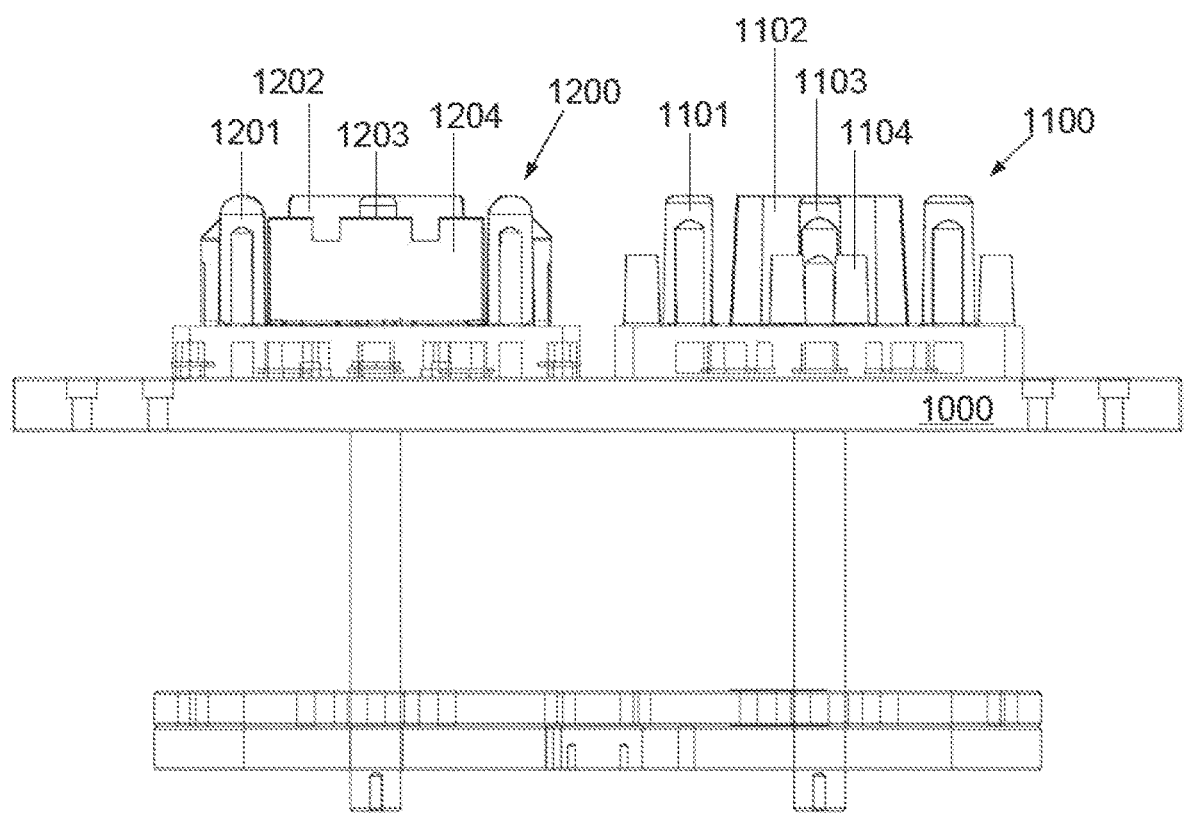
FIG. 17 illustrates a back view of a cooling rack according to some embodiments of the present disclosure.

In some embodiments, after the end product is ejected from the molding system, the end product may be placed on a cooling rack. FIG. 15 illustrates a planar view of a cooling rack according to some embodiments of the present disclosure. FIG. 16 illustrates a side view of a cooling rack according to some embodiments of the present disclosure. FIG. 17 illustrates a backside view of a cooling rack according to some embodiments of the present disclosure. In some embodiments, the cooling rack includes a platform 1000 and a plurality of positioning modules. The positioning modules includes a first positioning module 1100 configured to accommodate a first type of end product. The positioning modules further includes a second positioning module 1200 configured to accommodate a second type of end product. In some embodiments, the backside of the platform 1000 includes a plurality of through holes 1300 used for fastening the positioning modules onto the platform 1000 and delivering cooling fluid to the end products.

Figure 18:
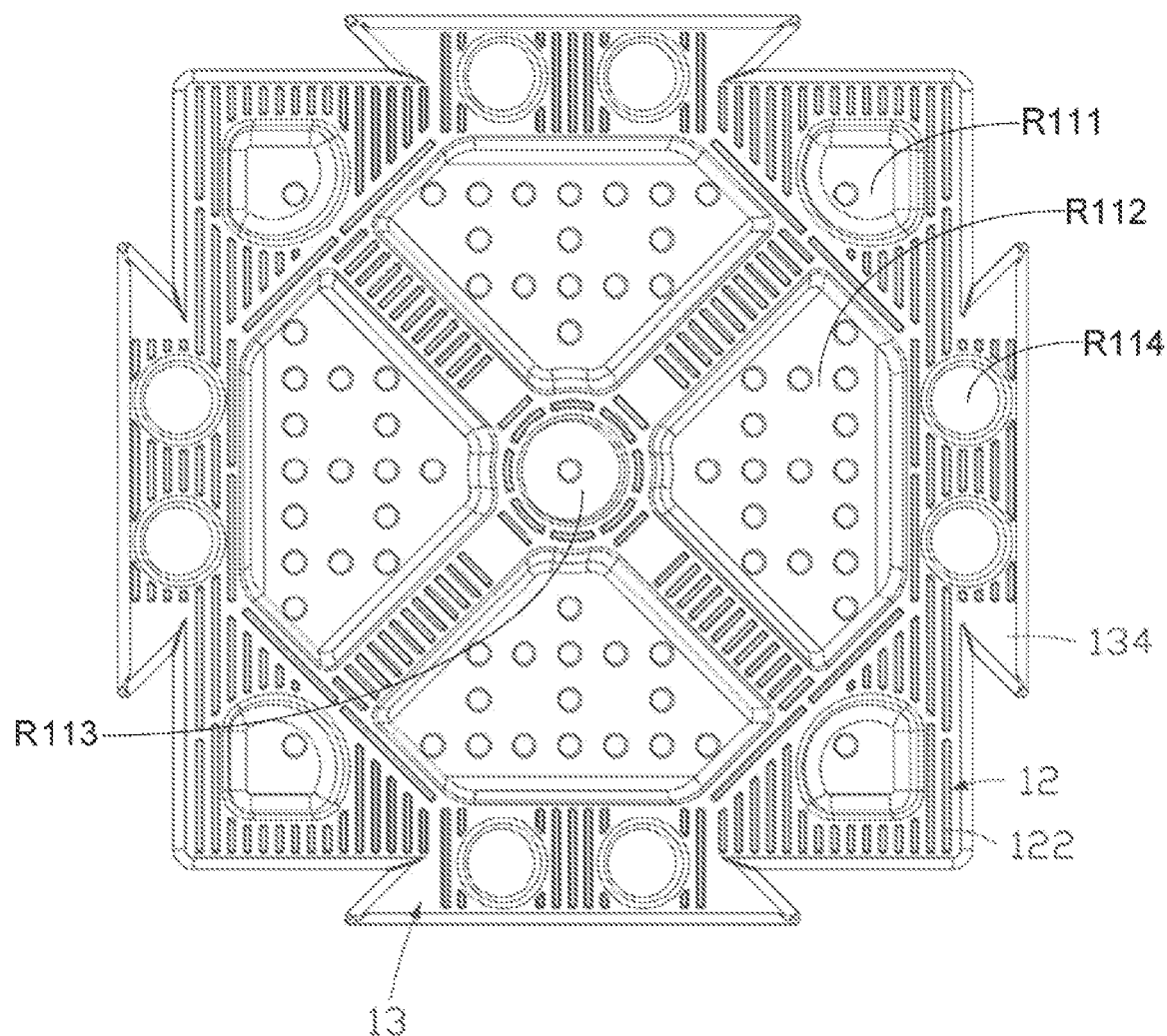
FIG. 18 illustrates a back view of a first type of end product according to some embodiments of the present disclosure.

FIG. 18 illustrates a backside view of a first type of end product according to some embodiments of the present disclosure. The first type of end product may be a protruding brick including a main body 12 and tenon structures 13 protruding from sidewalls of the main body 12. The bottom surface 122 of the main body 12 defines a plurality of recessed areas. The recessed areas include a corner recess R111, a side recess R112, and a central recess R113. The bottom surface 134 of the tenon structure 13 defines a tenon recess R114. The first positioning module 1100 includes a corner protrusion 1101 complementing the corner recess R111 of the first type of end product, a side protrusion 1102 complementing the side recess R112 of the first type of end product, a central protrusion 1103 complementing the central recess R113 of the first type of end product, and a tenon protrusion 1104 complementing the tenon recess R114 of the first type of end product. In some embodiments, a height of the tenon protrusion 1104 is less than a height of the corner protrusion 1101, the side protrusion 1102, and the central protrusion 1103.

Figure 19:
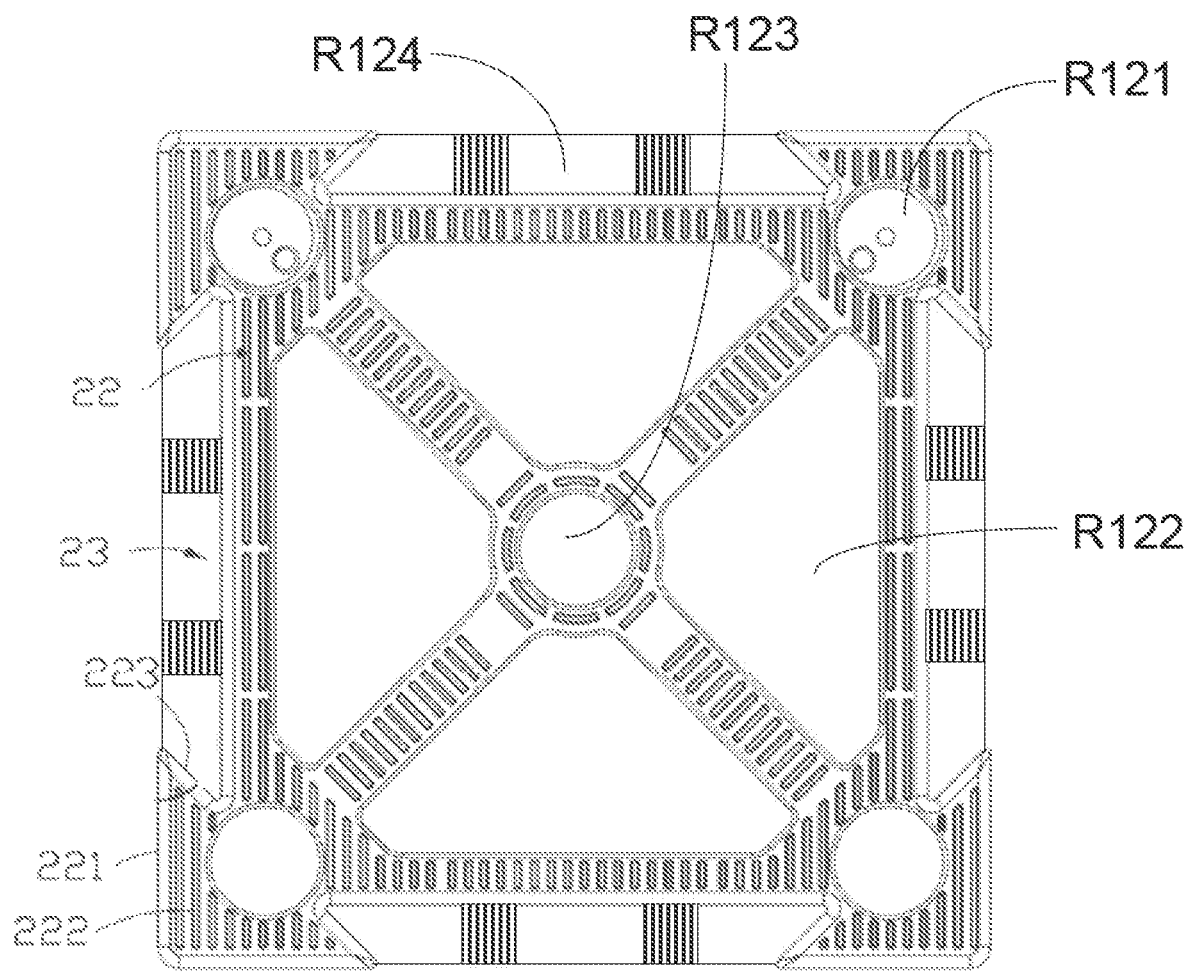
FIG. 19 illustrates a back view of a second type of end product according to some embodiments of the present disclosure.

FIG. 19 illustrates a backside view of a second type of end product according to some embodiments of the present disclosure. The second type of end product may be a recessing brick including a main body 22 and mortise structures 23 protruding from sidewalls of the main body 22. The bottom surface 222 of the main body 22 defines a plurality of recessed areas. The recessed areas include a corner recess R121, a side recess R122, a central recess R123, and a depression R124. In some embodiments, the mortise structures 23 are recessed areas on the sidewall of the main body 22. The mortise structure has an inward side surface 223 and the outward side surface 221. The second positioning module 1200 includes a corner protrusion 1201 complementing the corner recess R121 of the second type of end product, a side protrusion 1202 complementing the side recess R122 of the second type of end product, a central protrusion 1203 complementing the central recess R123 of the second type of end product, and a mortise protrusion 1204 complementing the mortise structures 23 of the second type of end product. The mortise protrusion 1204 complements the inward side surface 223 and outward side surface 221 of the mortise structures 23. Further, in some embodiments, the mortise protrusion 1204 has a toothed portion complementing the depressions R124 in the mortise structures 23. In some embodiments, a height of the mortise protrusion 1204 is less than a height of the corner protrusion 1201, the side protrusion 1202, and the central protrusion 1203.

Figure 9:
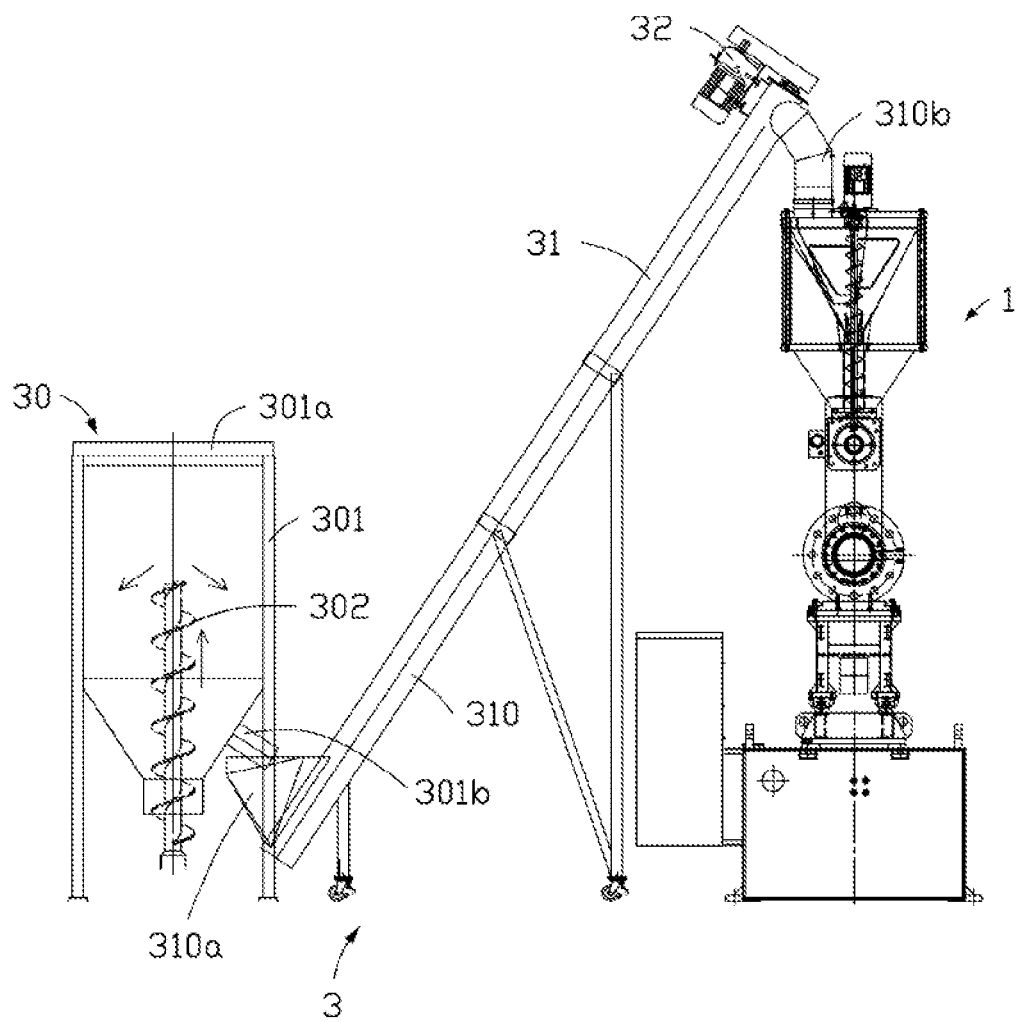
FIG. 9 illustrates a front view of an injection machine and a drying system according to some embodiments of the present disclosure.

FIG. 9 illustrates a front view of an injection machine and a drying system according to some embodiments of the present disclosure. The injection machine 1 further includes a drying system 3 configured to supply a large amount of the plastic to the supplying system 10. The drying system 3 includes a dry mixing barrel 30 and a side conveyor 31.

The dry mixing barrel 30 shown in FIG. 9 includes a barrel 301, a third driver (not shown in figure), and a stirring rod 302. The barrel 301 is a hollow body having a space to accommodate the plastic. The barrel 301 has a dry inlet (not shown in figure) and a dry outlet 301b. The dry inlet and the dry outlet 301b are in communication within the barrel 301 for the plastic to be provided through the dry inlet and discharged from the dry outlet. The barrel 301 includes an air outlet, a blower, and a heater (not shown in figure). The blower blows air into the heater to form hot air and increase the temperature of the air in the barrel 301. The hot air enters the barrel 301 from the air outlet to dry the plastic.

A stirring rod 302 is disposed within the barrel 301. The stirring rod 302 is a straight shaft. The surface of the stirring rod 302 is provided with a spiral sheet body. One end of the stirring rod 302 is fixed to the third driver. The stirring rod 302 is driven by the third driver to rotate around its own axis and mix and combine the plastic.

A side conveyor 31 includes a delivery pipe 310, a fourth driver 32, and a conveying screw (not shown in figures) disposed on a side of the injection machine 1. The delivery pipe 310 is a hollow body having a delivery space inside. The delivery pipe 310 has a delivery inlet 310a disposed close to one end of the dry mixing barrel 30 and a delivery outlet 310b disposed away from another end of the dry mixing barrel 30. The delivery inlet 310a and delivery outlet 310b of the delivery pipe 310 is in communication with each other within delivery pipe 310. The dried plastic is provided to the delivery pipe 310 through the delivery inlet 310a and exits the delivery pipe 310 through the delivery outlet 310b. The fourth driver 32 can be installed near one end of the delivery pipe 310 that is near the delivery outlet 310b. The conveying screw has a straight shaft having a spiral sheet on its surface. One end of the conveying screw is affixed to the fourth driver 32 and is driven by the fourth driver 32 to rotate around its axis and further rotate the plastic. In this way, the plastic is conveyed from the delivery inlet 310a to the delivery outlet 310b.

Figure 10:
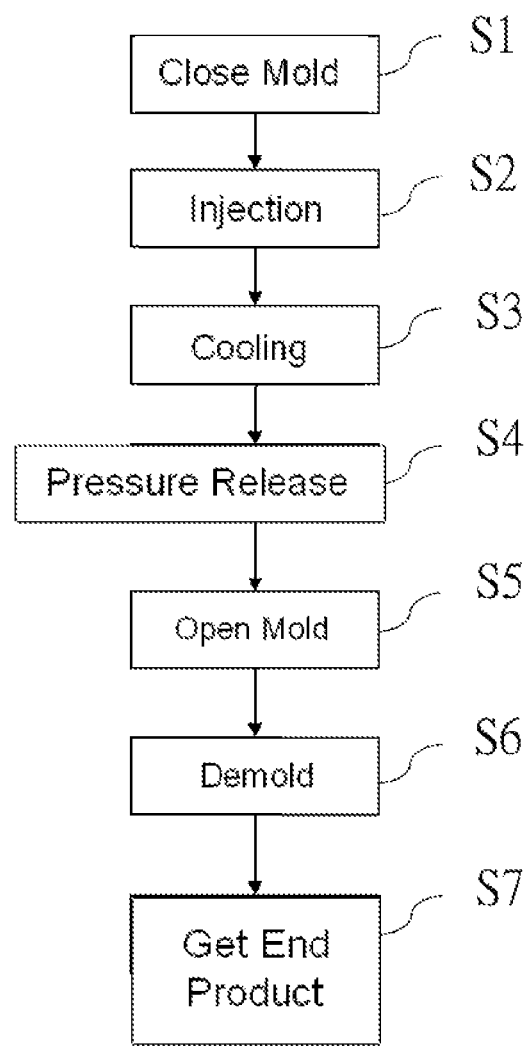
FIG. 10 illustrates a flowchart of a method of operation of a plastic injection molding system according to some embodiments of the present disclosure.

FIG. 10 illustrates a flowchart of a method of operation of a plastic injection molding system according to some embodiments of the present disclosure. In step S1, the movable mold plate 24 moves toward the fixed mold plate 22 to lock the mold 28. In step S2, the plastic that entered the buffer system 13 from the heating system 11 is squeezed into the pressure holding system 14 using the plunger rod 131, and directly enter the molding device 2 to fill the mold cavity in the mold 28 to form an end product. In step S3, the end product in the molding device 2 is cooled in the cavity. In step S4, after the end product has cooled down, the pressure holding rod 141 will retreat towards the pressure holding cylinder 142. In step S5, the movable mold plate 24 will move away from the fixed mold plate 24 to open the mold. In step S6, the mold ejection mechanism will eject the end product. In step S7, the end product is taken out.

Further, before the injection of plastic in step S2, the switch valve SH of injection machine 1 will be opened to allow the plastic of heating system 11 to enter buffer system 13. When the amount of plastic reaches the desired injection volume, the switch valve SH will be closed to prevent plastic from being squeezed back into heating system 11 during injection.

In addition, the thicker the end product is, the longer the time is required for cooling. Therefore, if a thicker end product is to be produced, the cooling step can be performed again before the demolding in step S6. In this way, deformation due to incomplete solidification of the end product after demolding is prevented.

Figure 11:
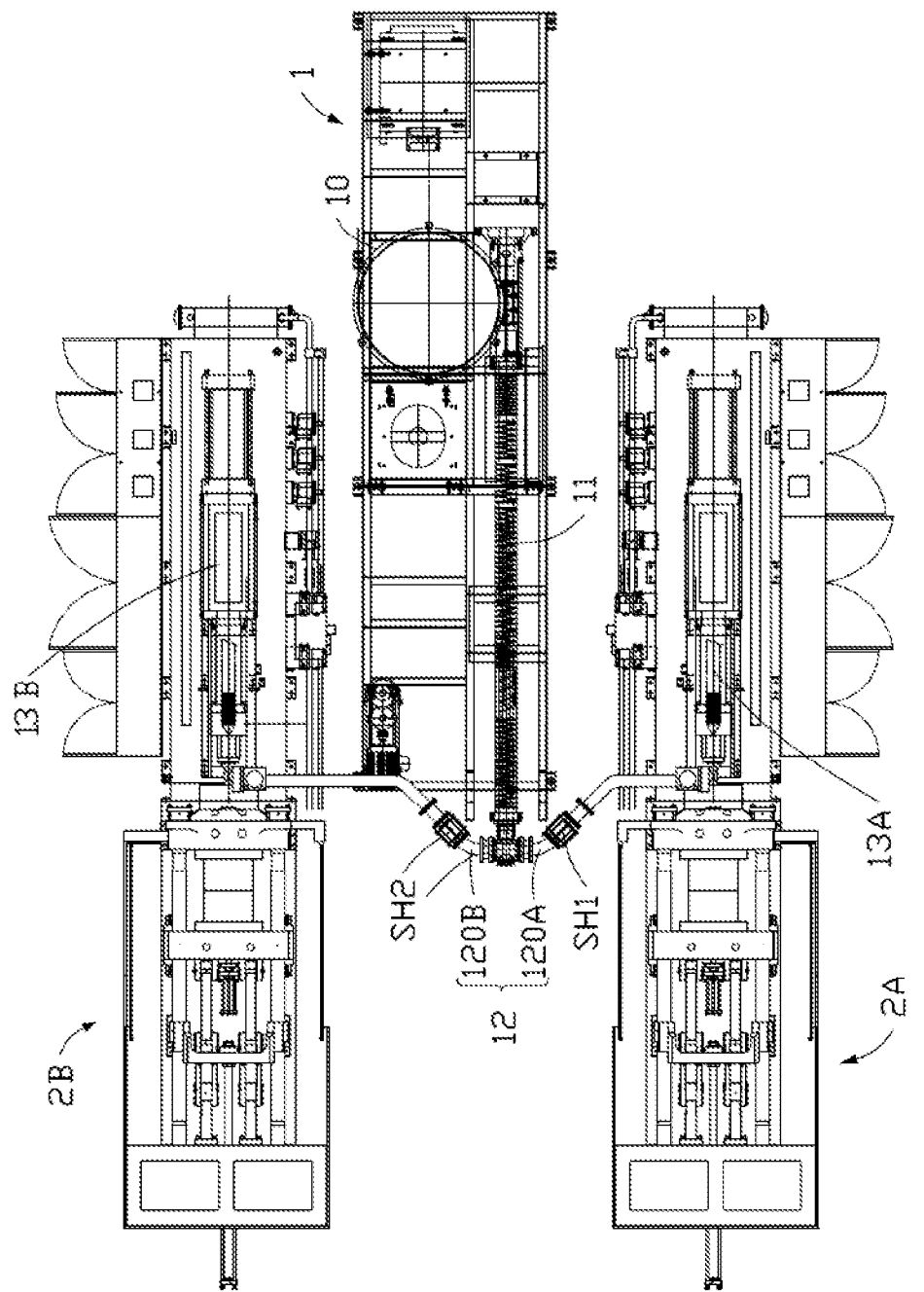
FIG. 11 illustrates a front view of an injection machine corresponding to two molding device according to some embodiments of the present disclosure.

FIG. 11 illustrates a front view of an injection machine corresponding to two molding device according to some embodiments of the present disclosure. The plastic injection molding machine provides plastic to two molding devices 2A and 2B from one injection machine 1. In some embodiments, the injection machine 1 includes a supplying system 10 and the heating system 11 as shown in FIG. 3. And, the injection machine 1 further includes two material pipes 120A and 120B, two switch valves SH1 and SH2, and two buffer systems 13A and 13B, each corresponding to plastic transport channel 12 of molding device 2A and 2B. In this embodiment, the buffer system and the pressure holding system can be combined into one system, and the buffer systems 13A and 13B have the aforementioned pressure holding function.

Figure 12:
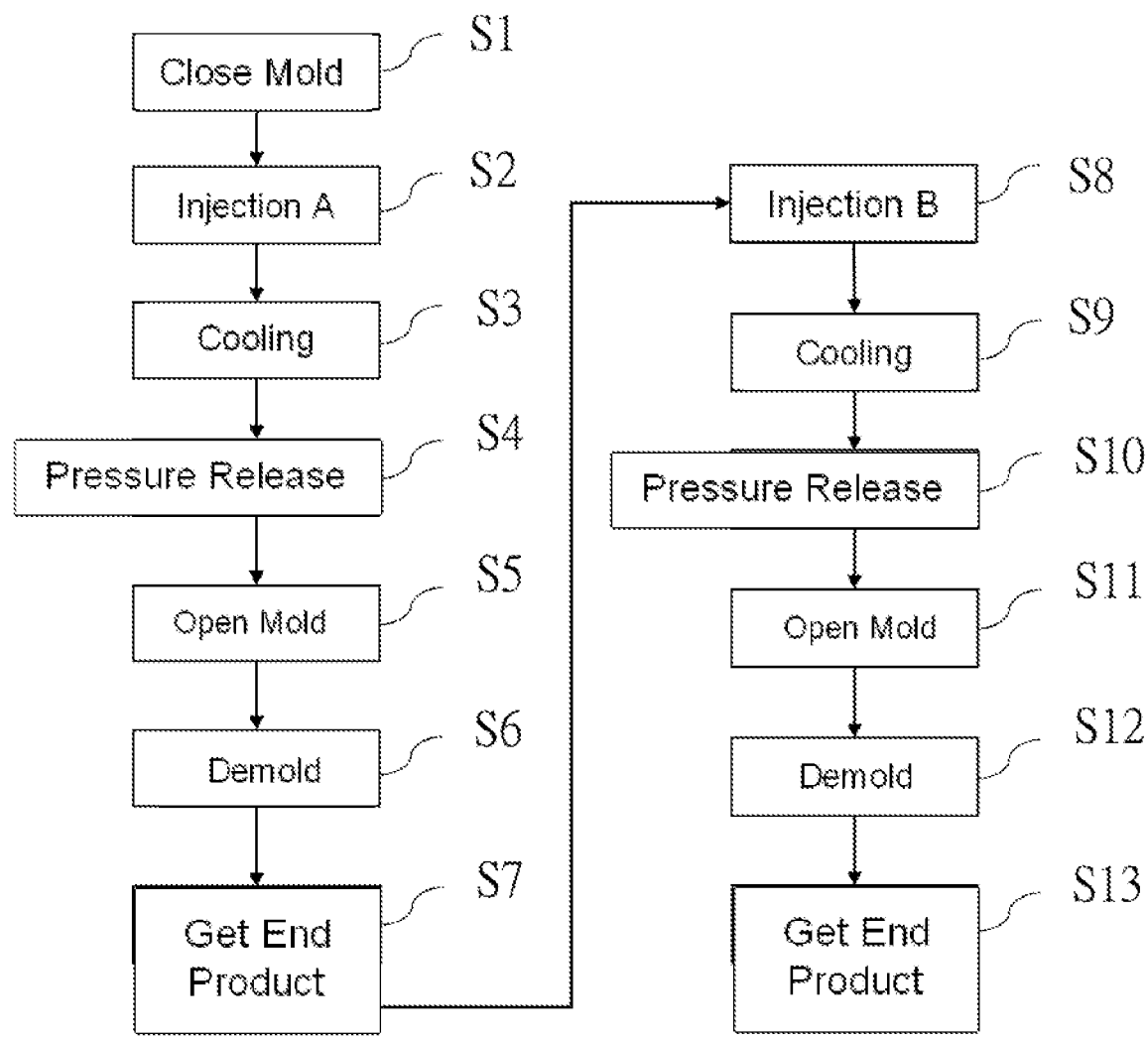
FIG. 12 illustrates a flowchart of a method of operation of an injection machine corresponding to two molding devices according to some embodiments of the present disclosure.

FIG. 12 illustrates a flowchart of a method of operation of an injection machine in FIG. 11 corresponding to two molding device according to some embodiments of the present disclosure. In step S1, the respective movable mold plates 24 of the molding devices 2A and 2B will approach the fixed mold plate 22 to lock the mold. Then, the buffer system 13A and molding device 2A perform steps S2-S7. The buffer system 13B and molding device 2B perform steps S8-S13. The description of steps S2-S7 and steps S8-S13 are same as in steps S2-S7 of FIG. 10 and will not be described again for brevity. In addition, the buffer system 13B and the molding device 2B performing injection B of step S8 is not limited to being performed after the molding device 2A completing step S7. It can also be performed simultaneously with steps S2-S7.

Before the plastic injection of step S2, the switch valve SH1 of injection machine 1 will be turned on and the switch valve SH2 will be turned off to allow the plastic of heating system 11 to enter buffer system 13A. When the plastic volume reaches the desired injection volume, the switch valve SH1 will be closed to prevent the plastic from squeezing back into the heating system 11 when the plastic is injected. Before step S8, the switch valve SH2 will be opened and the switch valve SH1 will be closed to allow the plastic of heating system 11 to enter the buffer system 13B. When the amount of plastic reaches the desired injection volume, the switch valve SH2 will be closed and then steps S8~S13 are performed.

Figure 13:
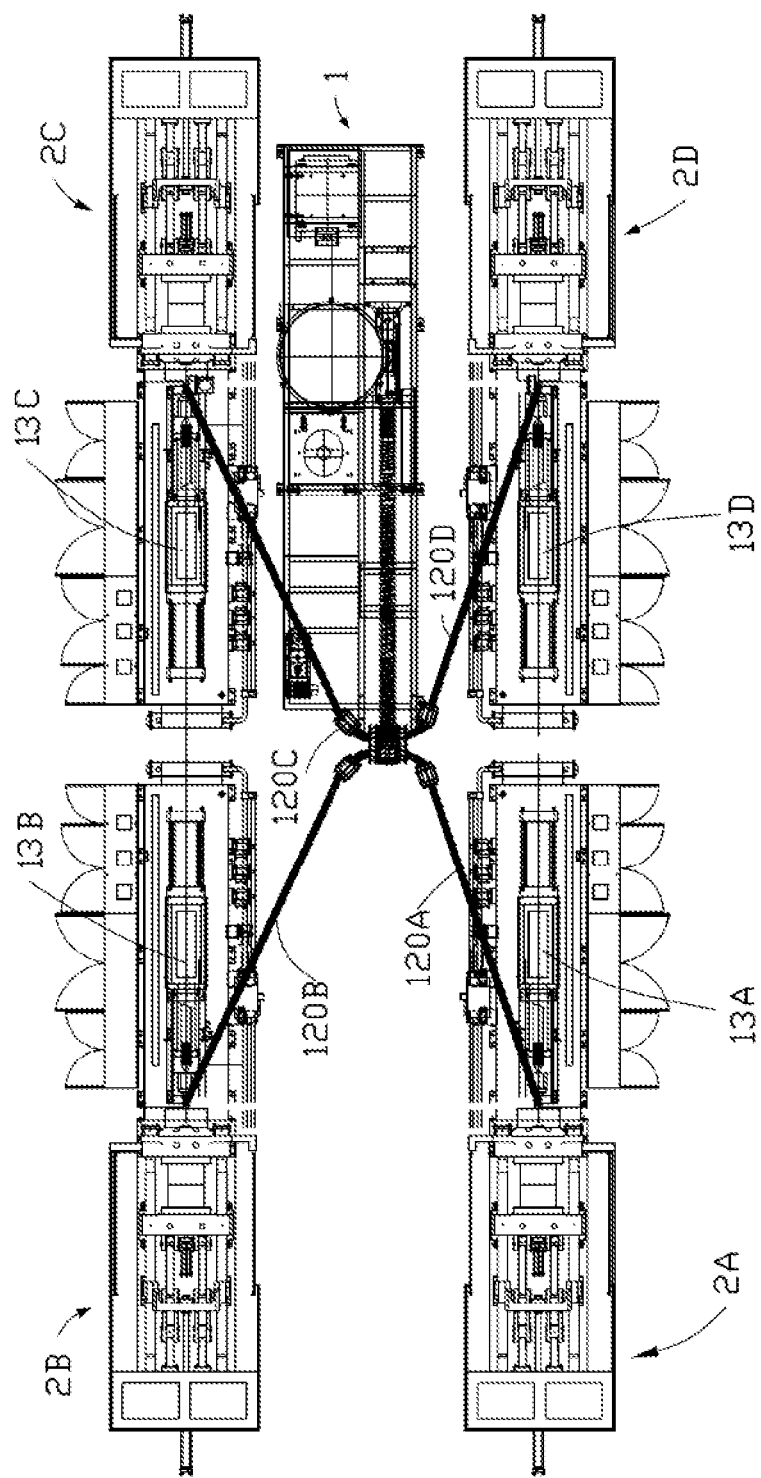
FIG. 13 illustrates a front view of an injection machine corresponding to four molding devices according to some embodiments of the present disclosure.

FIG. 13 illustrates a front view of an injection machine corresponding to four molding devices according to some embodiments of the present disclosure. The plastic injection molding machine supplies plastic to four molding devices 2A, 2B, 2C, and 2D from one injection machine 1. The injection machine 1 includes the supplying system 10 and the heating system 11 as shown in FIG. 3. The injection machine 1 further includes a material pipe 120A, 120B, 120C, and 120D, a switch valve SH1, SH2, SH3, and SH4, and a buffer system 13A, 13B, 13C, and 13D, each of above respectively corresponding to the four molding device 2A, 2B, 2C, and 2D. In this embodiment, the buffer system and the pressure holding system can be combined into one system, and the buffer systems 13A, 13B, 13C, and 13D can have the aforementioned pressure holding function.

Figure 14:
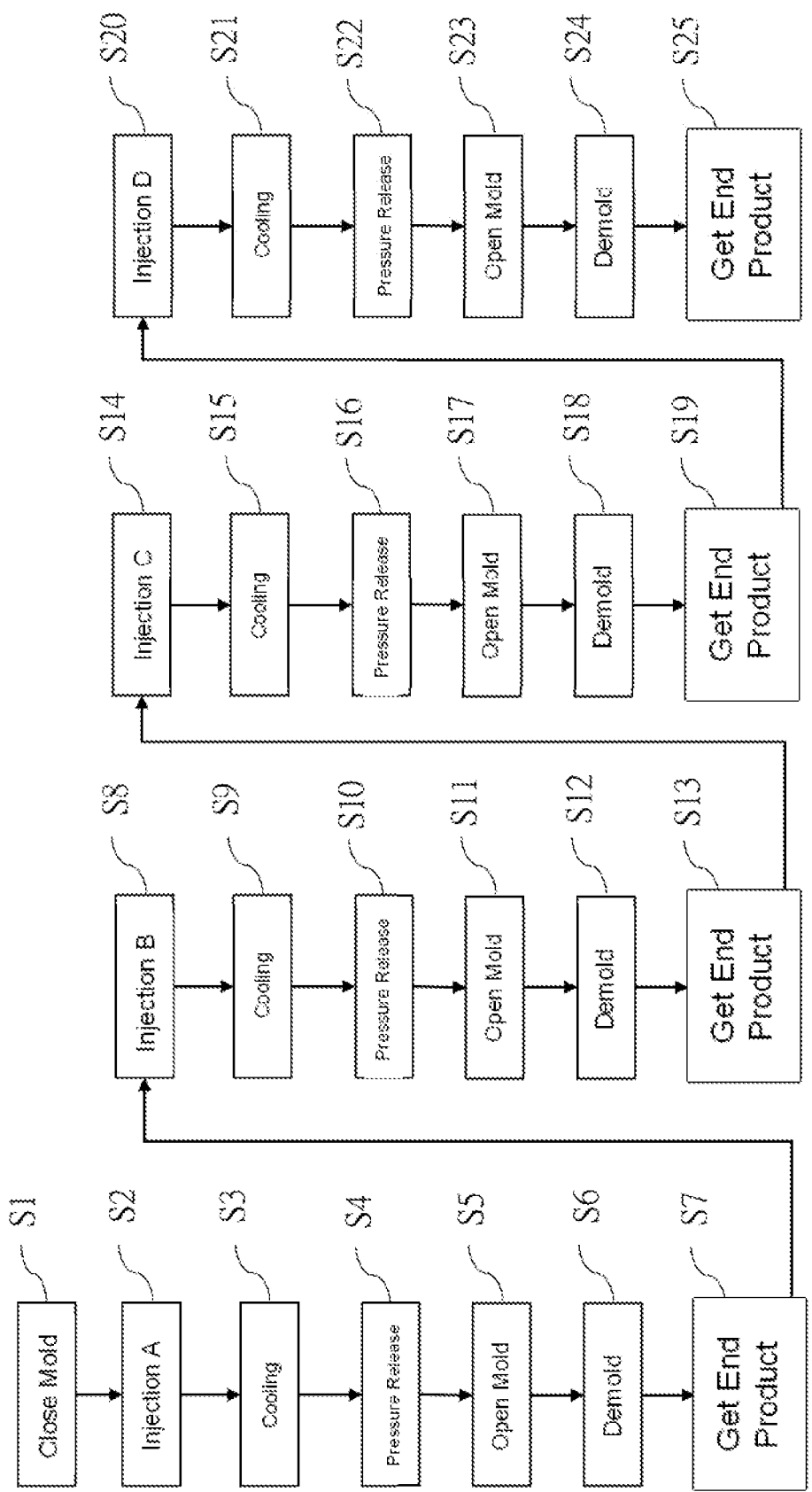
FIG. 14 illustrates a flowchart of a method of operation of an injection machine corresponding to four molding devices according to some embodiments of the present disclosure.

FIG. 14 illustrates a flowchart of a method of operation of an injection machine corresponding to four molding devices as shown in FIG. 13 according to some embodiments of the present disclosure. In step S1, the movable mold plates 24 of the molding devices 2A, 2B, 2C, and 2D will approach the fixed mold plate 22 to lock the mold. Then, the buffer system 13A and molding device 2A perform steps S2-S7; the buffer system 13B and the molding device 2B perform steps S8-S13; the buffer system 13C and the molding device 2C perform steps S14-S19; the buffer system 13D and the molding device 2D perform steps S20-S25. The description of the above mentioned steps are same as in steps S2-S7 of FIG. 10, and will not be described again for brevity. The abovementioned steps of each buffer system and each molding device need not wait for completing a preceding step of removing end product from molding device before being performed. The abovementioned steps can be simultaneously performed.

Similar to the previous steps, when each buffer system and molding device are in the injection step, only the corresponding switch valve will be opened to prevent the plastic from squeezing back into the heating system 11 when the plastic is injected. The other switch valves will be closed. For example, before performing injection A in step S2, the switch valve SH1 of the injection machine 1 will be turned on. The other switch valves SH2, SH3, and SH4 will be closed. In this way, the plastic of heating system 11 enters buffer system 13A. When the amount of plastic reaches the desired injection volume, the switch valve SH1 will be closed and the steps S2-S7 will be performed.

According to the disclosure, the exemplary injection machine corresponds to more than one molding device, but the number of molding devices is not limited thereto.

The following table shows the injection units of the injection machine of the present disclosure and the conventional injection machine with a clamping force of 600 T.

|  | injection machine of the present disclosure | conventional injection machine with 600l clamping force |
| --- | --- | --- |
| Theoretical injection volume (cm³) | 14130 | 1960 |
| Injection rate (cm³/sec) | 1890 | 472 |
| Injection weight (gram,) | 9891 | 1391 |
| Number of electric heating sections (zone) | 14 | 8 |

-continued

|  | injection machine of the present disclosure | conventional injection machine with 600T clamping force |
|---|---|---|
| Electric heating capacity (kw) | 60 | 16.5 |

It can be seen from the above table that the maximum injection weight of a conventional injection machine with a 600 T clamping force can only be 1.39 kg, while the enhanced injection machine of the disclosure with specification of 600 T clamping force has a maximum injection weight of about 10 kg. Generally, to achieve an injection machine with a maximum injection weight of about 10 kg, an injection machine need a specification of 1800 T clamping force. However, the injection machine of the present disclosure only requires 600 T to reach a maximum injection weight of nearly 10 kg. Therefore, the present disclosure can reduce equipment costs and reduce energy consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An injection machine for a recycled plastic injection molding system used with at least one molding device to produce an end product from plastic, the injection machine comprising:
    a supplying system disposed on an upstream of a receiving route of the injection machine, the supplying system having a first material drive device without having heating elements and configured to drive the plastic in a non-molten state from an entry end to a downstream of a receiving route of the supplying system;
    a heating system disposed on the downstream of the receiving route of the supplying system, the heating system having a second material drive device and a heating device, the first material drive device extends to the heating system, the heating device is configured to heat and transform the plastic from the non-molten state to a molten state, the second material drive device being configured to drive the plastic to a downstream of a receiving route of the heating system;
    a buffer system disposed on the downstream of the receiving route of the heating system, the buffer system having a piston and a cylinder coupled to the second material drive device; and
    a pressure holding system disposed on a downstream of a receiving route of the buffer system, the pressure holding system having a pressure holding device, the pressure holding device configured to provide the molding device with a pressure, wherein:
    the first material drive device has a first driver and a feed screw,
    the second material drive device has a second driver and a heating screw,
    the feed screw and the heating screw are configured to be at a distance from each other, the distance ranging between 20-40 mm,
    the buffer system is configured to have a receiving state and a supplying state,
    the buffer system is configured to receive the plastic from the heating system and push the piston to a receiving position when the buffer system is at the receiving state,
    the buffer system is configured to drive the plastic in the molten state to the downstream of the receiving route of the injection machine when the buffer system is at the supplying state; and
    a switch valve disposed between the heating system and the buffer system and configured to selectively trigger the receiving state and the supplying state of the buffer system, wherein:
    the buffer system is switched to the receiving state when the switch valve is at an open state, and
    the buffer system is switched to the supplying state when the switch valve is at a closed state.

2. The injection machine of claim 1, wherein the cylinder has a plunger tube, and the piston has a plunger rod.

3. The injection machine of claim 1, further comprising:
    a drying system disposed on an upstream of the supplying system and configured to provide the plastic to the supplying system, the drying system having a dry mixing barrel and a side conveyor, the dry mixing barrel having a barrel and a stirring rod penetrating the barrel, and the side conveyor being disposed between the dry mixing barrel and the supplying system.

4. The injection machine of claim 1, wherein at least one blade is arranged at a surface of the feed screw and configured to prevent the plastic from floating upward.

5. An injection machine for a recycled plastic injection molding system used with at least one molding device to produce an end product from plastic, the injection machine comprising:
    a supplying system having a hopper and a first driver disposed on the hopper, the first driver having a feed screw penetrating the hopper, and the first driver is-being configured to drive the feed screw to rotate;
    a heating system disposed on a downstream of the supplying system, the heating system having a heating pipe, wherein:
    the supplying system includes no heating elements and is configured to drive a plastic in a non-molten state to the heating system,
    the feed screw of the first driver extends to the heating system, a second driver is disposed on one end of the heating pipe, the second driver has a heating screw penetrating the heating pipe, and the second driver is configured to drive the heating screw to rotate,
    the feed screw and the heating screw are configured to be at a distance from each other, the distance ranging between 20-40 mm;
    a buffer system disposed on a downstream of the heating system, the buffer system having a plunger tube and a plunger rod slidably installed and sealed within the plunger tube; and
    a pressure holding system disposed on a downstream of the buffer system, the pressure holding system having a pressure holding pipe and a pressure holding rod slidably installed and sealed within the pressure holding pipe.

6. The injection machine of claim 5, wherein the first driver is configured to drive the feed screw to further drive the plastic from the hopper to the downstream of the supplying system.

7. The injection machine of claim 5, wherein the second driver is configured to drive the heating screw to rotate and drive the plastic to the downstream of the heating system the heating pipe having a heating device configured to heat and transform the plastic from the non-molten state to a molten state.

8. The injection machine of claim 5, further comprising:
a drying system disposed on an upstream of the supplying system and configured to deliver the plastic to the supplying system, the drying system having a dry mixing barrel and a side conveyor, the dry mixing barrel having a barrel and a stirring rod disposed within the barrel, and the side conveyor being disposed between the dry mixing barrel and the supplying system.

9. The injection machine of claim 5, wherein the first driver and the second driver employ a frequency conversion drive motor.

10. The injection machine of claim 5, wherein at least one blade is arranged at a surface of the feed screw and configured to prevent the plastic from floating upward.

* * * * *